(12) United States Patent
Gilgur et al.

(10) Patent No.: US 7,783,510 B1
(45) Date of Patent: Aug. 24, 2010

(54) COMPUTER STORAGE CAPACITY FORECASTING SYSTEM USING CLUSTER-BASED SEASONALITY ANALYSIS

(75) Inventors: Alexander Gilgur, Sunnyvale, CA (US); Michael F. Perka, Mountain View, CA (US)

(73) Assignee: Quest Software, Inc., Aliso Viejo, CA (US)

( * ) Notice: Subject to any disclaimer, the term of this patent is extended or adjusted under 35 U.S.C. 154(b) by 505 days.

(21) Appl. No.: 11/823,108

(22) Filed: Jun. 25, 2007

Related U.S. Application Data (60) Provisional application No. 60/805,728, filed on Jun. 23, 2006, provisional application No. 60/805,729, filed on Jun. 23, 2006, provisional application No. 60/945,546, filed on Jun. 21, 2007.

(51) Int. Cl.
*G06F 17/50* (2006.01)
(52) U.S. Cl. .......................................... 705/7
(58) Field of Classification Search .................. 705/7, 705/10
See application file for complete search history.

(56) References Cited

U.S. PATENT DOCUMENTS

| 7,058,708 | B2 | 6/2006 | Gold et al. |
|---|---|---|---|
| 2002/0169657 | A1 | 11/2002 | Singh et al. |
| 2002/0174005 | A1 | 11/2002 | Chappel |
| 2002/0194326 | A1 | 12/2002 | Gold et al. |
| 2003/0154271 | A1 | 8/2003 | Baldwin et al. |
| 2003/0158772 | A1 | 8/2003 | Harris |
| 2005/0055603 | A1 | 3/2005 | Soran et al. |
| 2005/0259683 | A1 | 11/2005 | Bishop et al. |
| 2008/0256099 | A1* | 10/2008 | Chodorov et al. ........... 707/100 |

OTHER PUBLICATIONS

Gardner Jr; Exponential Smoothing: The State of the Art; 1985; Journal of Forecasting, vol. 4, 28 pages.*
International Search Report from PCT/US08/54802, Jun. 27, 2008, 8 pages.
International Search Report from PCT/US07/03555, Feb. 9, 2007, 7 pages.
Horizon UI Release 1 GUI External Functional Spec Revision: 1.10, Oct. 4, 2005, pp. 1-56, Monosphere, U.S.A.
*Storage Horizon*™ Systematic Capacity Planning Agent-less software solution to optimally manage and plan storage growth, Product Brochure, 2004, 4 pages, Monosphere, U.S. A.

(Continued)

*Primary Examiner*—Thomas Dixon
(74) *Attorney, Agent, or Firm*—Knobbe Martens Olson & Bear, LLP (57) ABSTRACT

A methodology for automatic a priori data pattern analysis is provided. Described methods allow consistent and objective determination of outliers; trend; seasonality; and level shifts; and the production of better models and more accurate forecasts. In addition, a two-step way to automatically determine seasonality and locate possible events in the data set is described. Decomposition of data into seasonal, trend and level components; detection of outliers and level-shift events in the time series based on statistical analysis of the time series; detection of seasonality based on statistical analysis of clusters of data, known as cluster-based seasonality analysis, or CBSA; evaluation of the goodness of fit of a model to data, using the existing goodness of fit indicator, $R^2$; and seasonality analysis, using a sequence of cluster-based seasonality analysis (CBSA) and Fourier analysis are described.

20 Claims, 10 Drawing Sheets

OTHER PUBLICATIONS

Systematic Storage Capacity Planning The Case for an Ongoing Strategic Planning Process, White Paper, 2005, pp. 1-10, Monosphere, U.S.A.

Storage Horizon™ User's Guide Version 2.1, 2005, pp. 1-88, Monosphere, U.S.A.

* cited by examiner

Fig. 6a Historical Data

Figure 6b. Corresponding Rate data

COMPUTER STORAGE CAPACITY FORECASTING SYSTEM USING CLUSTER-BASED SEASONALITY ANALYSIS

CROSS-REFERENCE TO RELATED APPLICATIONS

This application claims the benefit of U.S. provisional applications 60/805,728, filed on Jun. 23, 2006; 60/805,729, filed on Jun. 23, 2006; and 60/945,546, filed on Jun. 21, 2007. Each of the above applications is incorporated by reference herein in its entirety.

This application is also related to U.S. patent application Ser. No. 11/823,111, titled "Evaluation of Data Models and Forecasts," filed on Jun. 25, 2007, and incorporated by reference herein in its entirety.

BACKGROUND

1. Field of the Invention

The present invention pertains in general to modeling and forecasting of data. In particular, the present invention is directed to automatic evaluation of patterns in time-series data.

2. Background of the Invention

A conventional approach to statistical modeling and forecasting is to use pre-existing knowledge of the data's behavior; to determine, using subject-matter experts' knowledge, how trended the data are, what seasonal variations in the data are observable, and what the level shifts and outliers signify. In some cases, mathematical curve-fitting is used to determine the trend; in some cases Fourier analysis is used to determine the frequency of seasonal variation. However, events such as outliers and level-shifts play a very important role in model quality and, if unaccounted for, may offset the uncertainty of the model and forecast, rendering it potentially meaningless. Yet events are typically either not determined or are determined using a subject-matter-expert's subjective opinion.

A traditional approach used in data analysis and forecasting has been trial and error, i.e., by running a data set through a series of models and determining which model fits best; an iterative approach to model tuning is sometimes also used. That includes, as an example, the so-called ARIMA model, wherein seasonality and trend are determined by fitting different trend and seasonal models until a best fit is found.

SUMMARY

The present invention provides a methodology for automatic a priori data pattern analysis. It enables an algorithm that allows consistent and objective determination of outliers; trend; seasonality; and level shifts; and the production of better models and more accurate forecasts. In addition, it includes a two-step way to automatically determine seasonality and locate possible events in the data set.

In particular, the present invention enables decomposition of data into seasonal, trend and level components; detection of outliers and level-shift events in the time series based on statistical analysis of the time series; detection of seasonality based on statistical analysis of clusters of data, (cluster-based seasonality analysis, or CBSA); evaluation of the goodness of fit of a model to data, using the existing goodness of fit indicator, $R^2$; and seasonality analysis, using a sequence of cluster-based seasonality analysis (CBSA) and Fourier analysis.

The described methods for data pattern analysis can be applied for preliminary data analysis prior to running a time-series forecasting model. The user is provided with the necessary objective information with regard to seasonal patterns, trend type, and events (level shifts and outliers) in the data.

Applications include, but are not limited to, a variety of areas, such as:
- Storage capacity modeling and forecasting;
- Statistical Process Control;
- Market analysis
- Supply-chain forecasting and other business applications.
- Traffic analysis and planning;
- Meteorology;
- and other applications.

The seasonality and trend information provided according to embodiments of the present invention are used to fine-tune forecasting models. Event information, in order to be used efficiently in forecasting models, may benefit from input from a subject-matter expert as to when these events are likely to occur in the future. Alternatively, some forecasting software can be used to predict the future schedule of such events (the so-called Croston model); however, that may skew the model's perception of the impact of such events. However, even without any knowledge of when an event is expected to happen in the future, knowledge that it did happen in the past greatly improves the usability of the model in forecasting, narrowing down the uncertainty of the forecast.

The present invention enables objective, consistent and accurate detection of possible events, trend, and seasonal patterns in a time series, allowing a user to minimize or eliminate the human interaction with the modeling and forecasting process.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
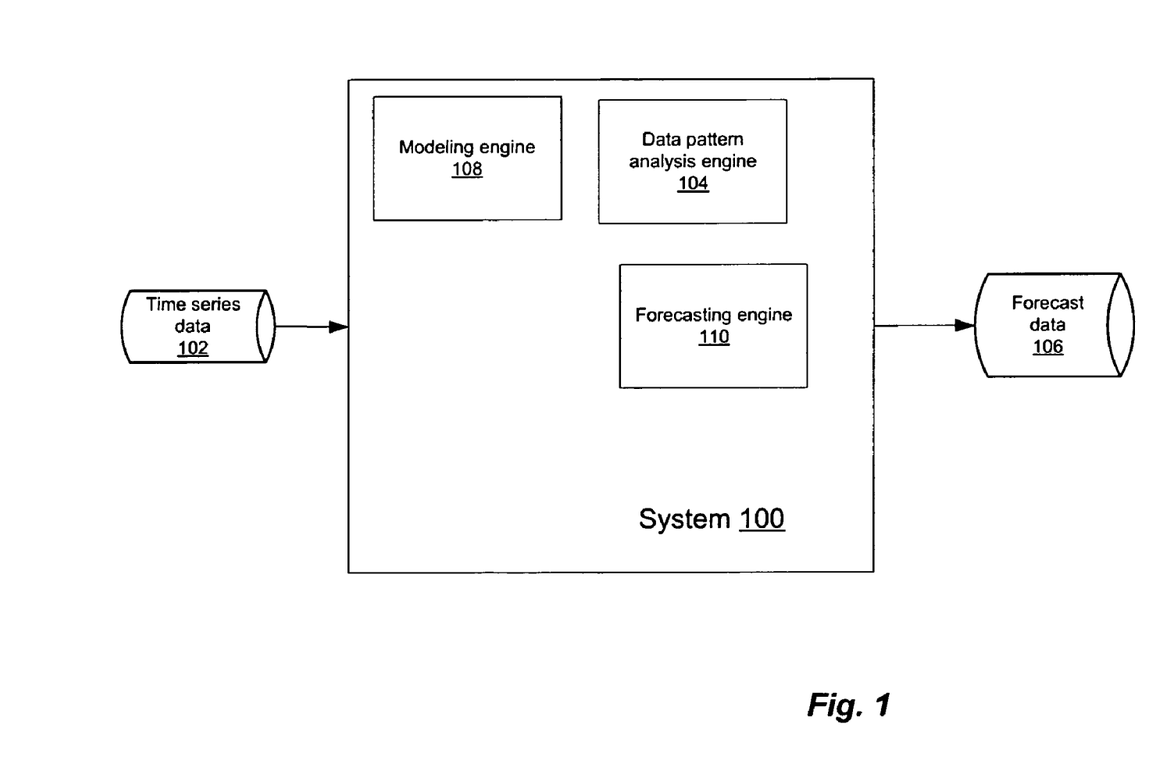
FIG. 1 illustrates a system 100 for performing data pattern analysis in accordance with an embodiment of the present invention.

FIG. 1 illustrates a system 100 for performing data pattern analysis in accordance with an embodiment of the present invention. System 100 receives as input time-series data 102, i.e. a sequence of numbers corresponding to data collected from a system of interest during a time period. Data pattern analysis engine (DPA) 104 analyzes this historical data 102 in order to find and interpolate outliers, identify trends in the data, de-trend the data, and find seasonality in the data, as described further below. DPA 104 then provides this information to modeling engine 108, which in turn generates a forecasting model based on the provided data from DPA engine 104. The model is then provided to forecasting engine 110, in order to generate forecast data 106, which can then be provided to a user. Modeling engine 108 and forecasting engine 110 in one embodiment are the Forecast Pro product, available from Business Forecast Systems, Inc.; in an alternative embodiment they are the Autobox system, available from AFS Inc.

Figure 2:
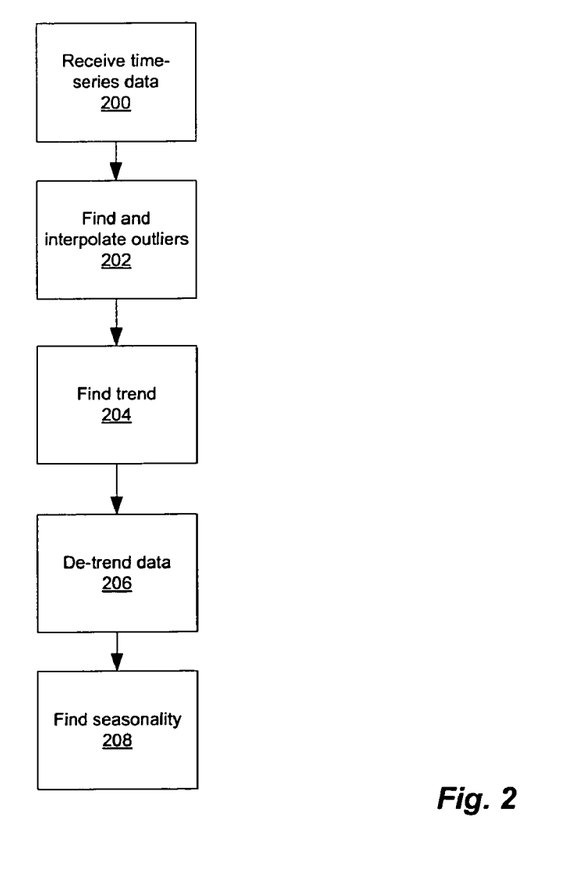
FIG. 2 illustrates a method for performing data pattern analysis in accordance with an embodiment of the present invention.

FIG. 2 illustrates a method for performing data pattern analysis. DPA 104 first receives 200 time series data 102, which as noted above is the data to be analyzed. Next, DPA 104 finds and interpolates 202 outliers in the data. Next, DPA 104 identifies 204 trends in the data. Following this, DPA 104 de-trends 206 the data, and finally finds 208 seasonality in the data.

In one embodiment, after the time series data 102 is received, it is checked for sufficiency by performing a standard T-test-based analysis of desired confidence limits. Confidence limits as well as other parameters are in one embodiment specified by a user at run-time, and alternatively are stored in a database of system 100 (not shown).

Outlier Detection and Processing

As is known in the art, an outlier is a statistical observation that is markedly different in value from the others of the sample. In time series analysis (TSA), outliers typically correspond to events and should generally be modeled using multivariate analysis methodologies. If, however, a user does not know what event occurred at the data points corresponding to outliers, then the only thing the modeling and forecasting system can do is either interpolate or ignore them. If, on the other hand, the time intervals between outliers are repeatable, that indicates a possible seasonal pattern in data.

Figure 3:
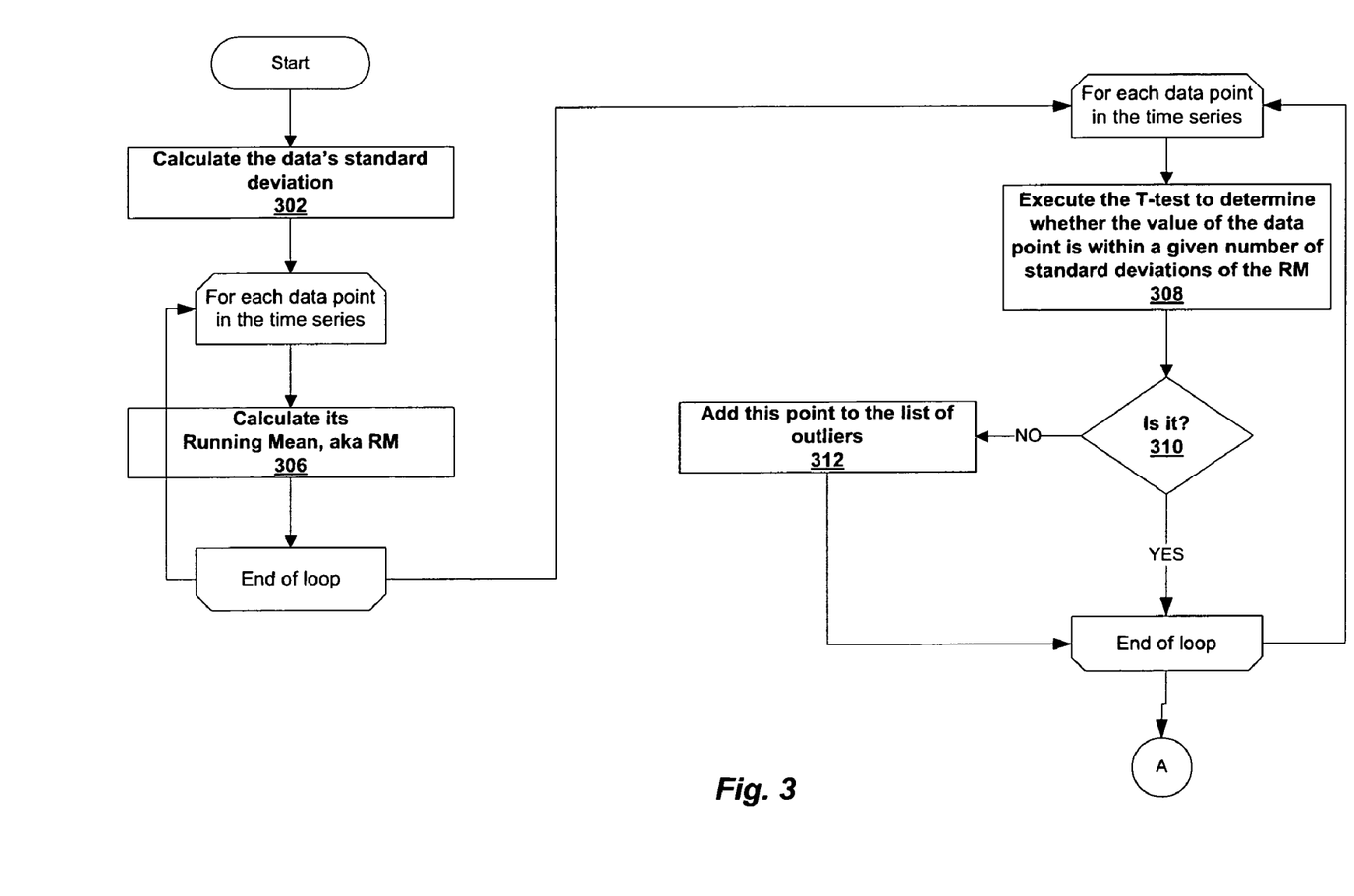
FIG. 3 and FIG. 4 illustrate detecting and processing of outliers 2010 in accordance with an embodiment of the present invention.
Figure 4:
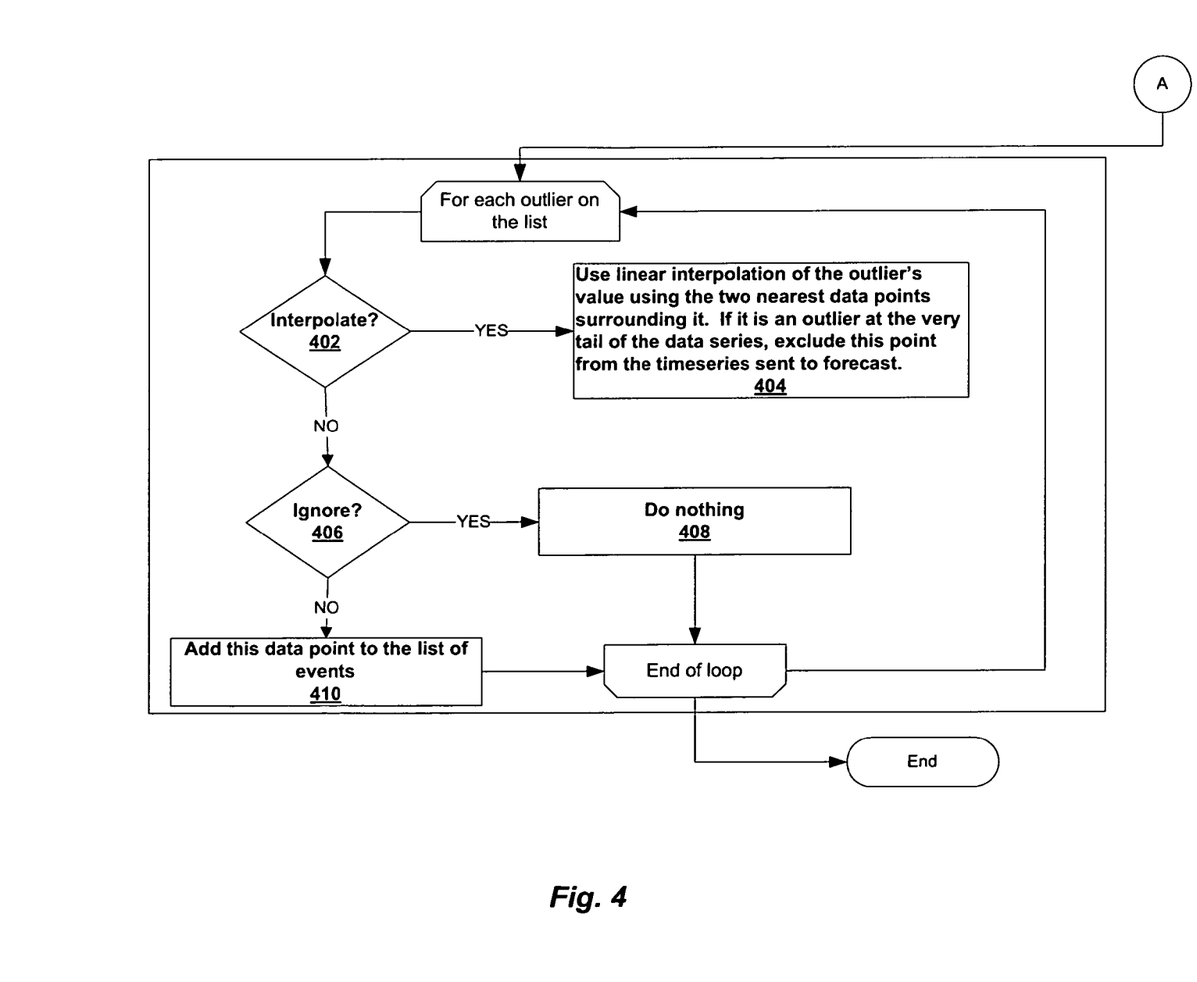

The step of outlier detection 202 is illustrated further with respect to FIG. 3 and FIG. 4. First, DPA 104 calculates 302 the standard deviation and 306 the so-called running mean (RM) of the data 102. In one embodiment, RM is calculated at each data point by calculating the average of all points up to this data point. Next, for each data point in the time series, a T-test is run 308 to determine whether the value of the data point is within a given number of standard deviations of the RM. A user can specify an appropriate T-test confidence level depending on the desired certainty in detecting outliers. If 310 the value of a data point is more than the specified number of standard deviations of the RM, it is added 312 to the list of outliers.

Next, and referring to FIG. 4, for each outlier on the outlier list, the point is either interpolated or ignored, depending on a preference that in one embodiment is specified by a user. If 402 the user has chosen to interpolate, then each outlier's value is substituted 404 with a value calculated using a standard linear interpolation formula. In one embodiment, if the outlier is the last data point in the time series, it is discarded. Alternatively, if 406 the user has indicated that outliers should be ignored, it is discarded 408.

Parameters that DPA 104 uses at this point, and which in one embodiment are user-supplied and in another embodiment are defaulted to automatically, are used to set the sensitivity and accuracy of the method, including the standard T-test parameters (confidence levels); the parameters for calculating the RM; as well as decision-making parameters for handling the outliers if detected.

Trend Detection and Detrending

Trend in data is an important parameter for the modeling engine 108 and forecasting engine 110. The trend information tells modeling engine 108 what to make of the data, and tells forecasting engine 110 what general tendency to expect of the data over the period covered by the forecast.

It is important to keep in mind that a trend found in data may or may not be the trend that can be used in forecasting, even if it is the trend providing the best-fitted model. This is particularly the case with polynomial trends. Most modeling and forecasting engines that can differentiate one trend type from another classify trends in time series as linear, where the difference in value between two adjacent data points does not change significantly; exponential, where the difference in value between two adjacent data points increases; or damped, also known as decaying-rate, where the difference in value between two adjacent data points decreases.

In these terms, in one embodiment, a quadratic trend found by the standard mathematical curve-fitting methodology is interpreted in terms of modeling and forecasting as either exponential or damped; exponential trend, too, is interpreted as exponential (if the values grow) or damped (if the values decrease asymptotically); etc.

Quadratic Trend

Some trends, e.g., polynomial, are not usable in forecasting, but are very useful in detrending data.

In one embodiment, quadratic trend (second-order polynomial) is added as a contender for detrending, but is interpreted as one of the three trends above, depending on the position of the maximum or minimum of the quadratic curve. Thus, if quadratic is the best-fitting trend, and if the maximum or minimum is towards the last part of the time series, then forecasting engine 110 interprets such data as damped. If the maximum or minimum of the data is at the very start of the quadratic curve, then forecasting engine 110 handles the trend as linear or exponential.

In either case, when quadratic is the best-fitting trend, data detrending is done using the quadratic trend (and not linear or damped) in one embodiment.

Figure 8A:
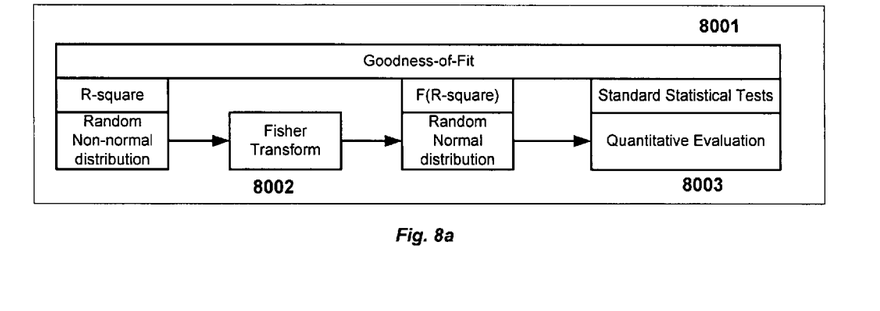
FIGS. 8a and 8b illustrate the evaluation of model correlation in accordance with an embodiment of the present invention.

FIG. 8a shows the foundations of the trend identification methodology that is implemented in one embodiment. The "goodness-of-fit" of the model 8001 is determined by the value of the so called Pearson's correlation coefficient and parameters derived from it, such as the $R^2$ (R-squared). It defines the fraction of the total variance in the data that has been explained by the model.

However, using $R^2$ directly to evaluate the model's "goodness-of-fit" is not very accurate, due to it being random, and its distribution not being normal. DPA 104 uses a Fisher transform 8002 to derive another parameter from correlation, which is distributed normally and therefore can be used in standard statistic tests 8003 to quantitatively evaluate the "goodness-of-fit" of the model.

Figure 8B:
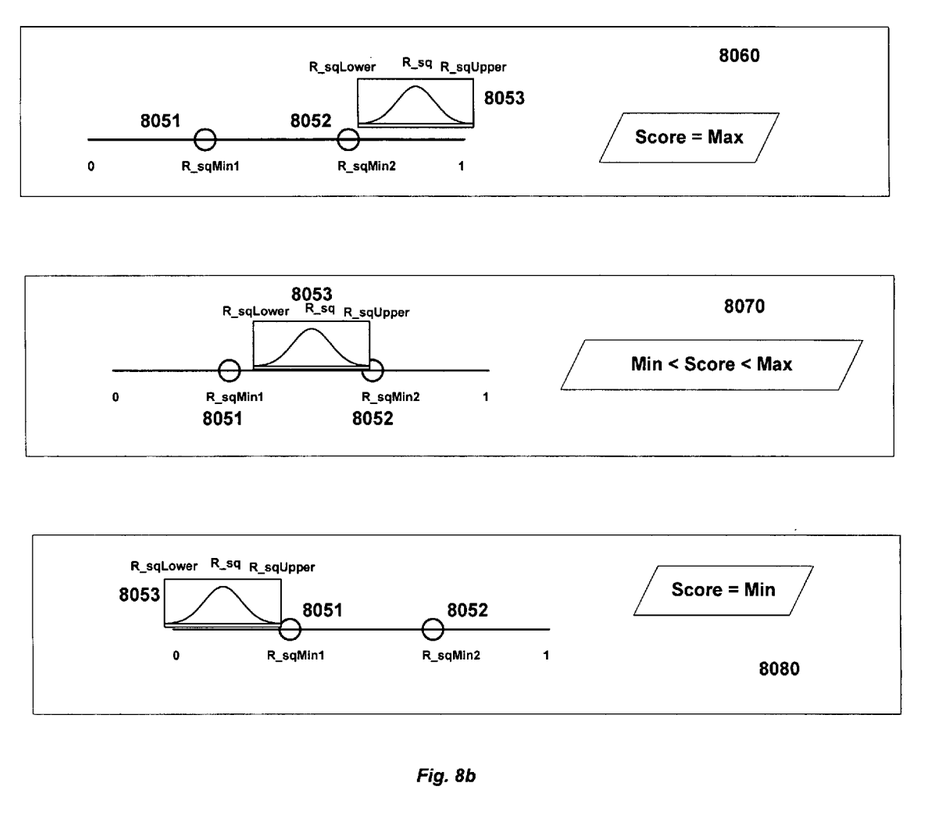

FIG. 8b illustrates the $R^2$ scoring system as may be implemented in accordance with an embodiment of the present invention. After using the statistical algorithms to obtain the distribution of Fisher-transformed $R^2$ 8053, it is superimposed with the segment (0 . . . 1) and its placement is compared with Fisher-transformed values of R_sqMin1 8051 and R_sqMin2 8052, which can be set as parameters. Typical industry values are 0.25 and 0.81, respectively. This placement is then quantified by assigning the maximum score to the case 8060 when the entire significant section of the distribution 8053 is to the right of R_sqMin2 8052, the minimum score to the case 8080 when the entire significant section of the distribution 8053 is to the left of R_sqMin1 8051, and a proportionally distributed score for cases 8070 when the distribution 8053 is anywhere in between the two extremes, the score then depending on the placement of the distribution's mean and the width of its standard deviation. Using such a scoring system, system 100 can then formally evaluate the trends and find the best-fitting trend for the data.

Figure 5:
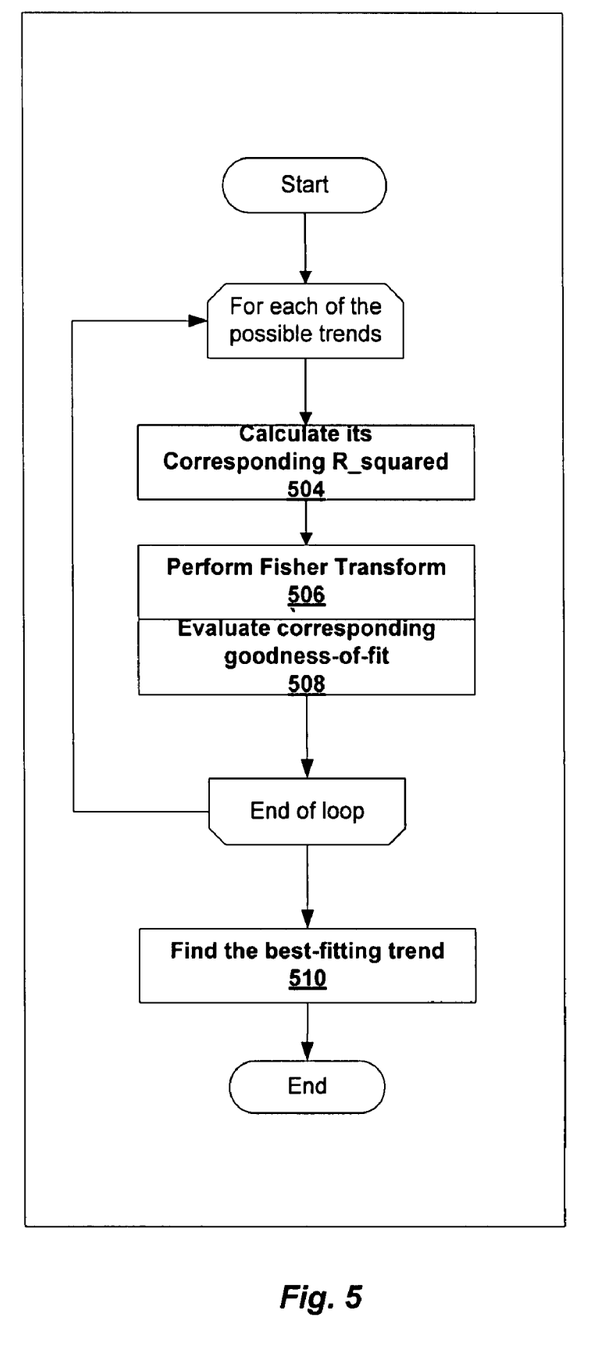
FIG. 5 illustrates a method for trend goodness-of-fit analysis in accordance with an embodiment of the present invention.

FIG. 5 illustrates a method for trend goodness-of-fit analysis in accordance with an embodiment of the present invention. After the outliers have been accounted for (see FIG. 3 and FIG. 4 above), the $R^2$ is calculated 504 for each of the possible relevant trends and, after Fisher Transform 506, evaluated 508 using statistical methods, and the best-fitted trend model is selected 510.

Once the best-fitting trend has been detected, it is saved in memory or on disk to notify modeling engine 108 and forecasting engine 110 and also is used to de-trend the data in order to ensure an accurate seasonality analysis.

In one embodiment, parameters provided to DPA engine 104 at this point are related to setting the preferred sensitivity and accuracy of the algorithm, including the standard T-test parameters (confidence levels) for $R^2$; the critical values of the Fisher-transformed $R^2$(R_sqMin1, R_sqMin2); trend preferences for cases where two or more trends fit so closely that there is no statistical difference in the $R^2$ score.

Additional parameters related to the interpretation of trend for forecasting engine 110 include such factors as the critical values of the curve parameters when an exponential trend may be considered linear; quadratic linear or exponential; etc.

These values help DPA engine 104 to identify the trend that is most suitable for detrending the data, as well as the trend that will provide a more reasonable forecast.

Seasonality Analysis

Seasonality is any pattern in the data that is periodic. The number of data points after which the pattern becomes repetitious is called the period of the seasonality, or seasonality for short.

In one embodiment, DPA 104 performs 208 seasonality analysis in two stages. The first stage is cluster-based seasonality analysis (CBSA), and the second stage is Fourier analysis. Depending on the user's preference, the stages can operate independently or in sequence. In one embodiment, DPA 104 includes three modes of operation with regard to Fourier analysis:

Never—the seasonality is the one that was found using CBSA, even if CBSA did not find any.

Sequentially—only if CBSA did not find a seasonality, e.g., if the data are changing seasonally, but in a very smooth pattern, CBSA will not find a seasonality (no outliers—no clusters—no seasonality). For such cases, Fourier analysis is used as a backup.

Always—this is the most all-embracing mode of operation. If CBSA and Fourier analysis both returned seasonality, then, if modeling engine 108 allows multiple seasonalities to be entered, then DPA engine 104 passes them all into modeling engine 108; if it is a single-seasonality engine, then DPA engine 104 picks one that has the highest impact on the data.

Other sequences are possible as well, including, but not limited to, using CBSA only if Fourier analysis did not find seasonality. Note that this may not be a very efficient proposition, since Fourier analysis is much more sensitive to deviations from the pattern.

Cluster-Based Seasonality Analysis (CBSA)

A cluster is an uninterrupted group of data points displaying similar behavior over a period of time. We refer to a cluster as a time interval between two consecutive events.

Figures 6, 6B:
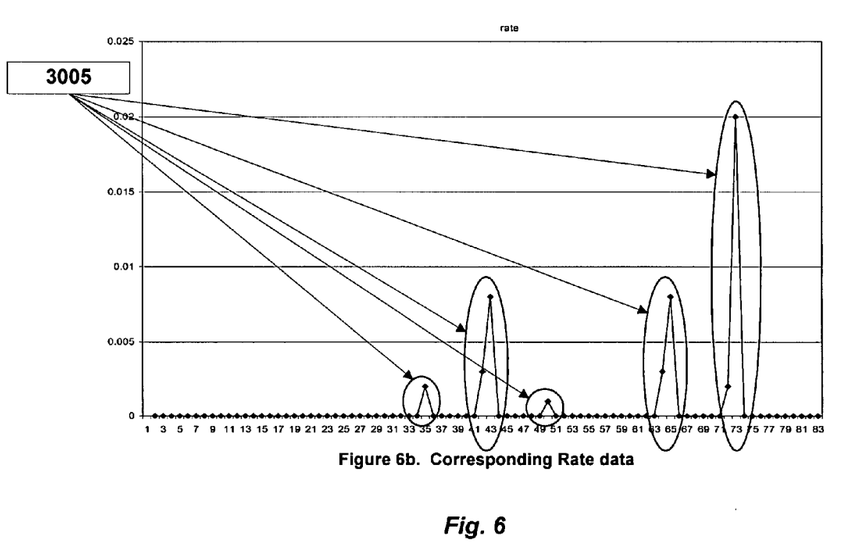
FIG. 6 illustrates the basis of the methodology used in locating level-shift events in the data and in determining data clusters in accordance with an embodiment of the present invention.
Figure 6A:
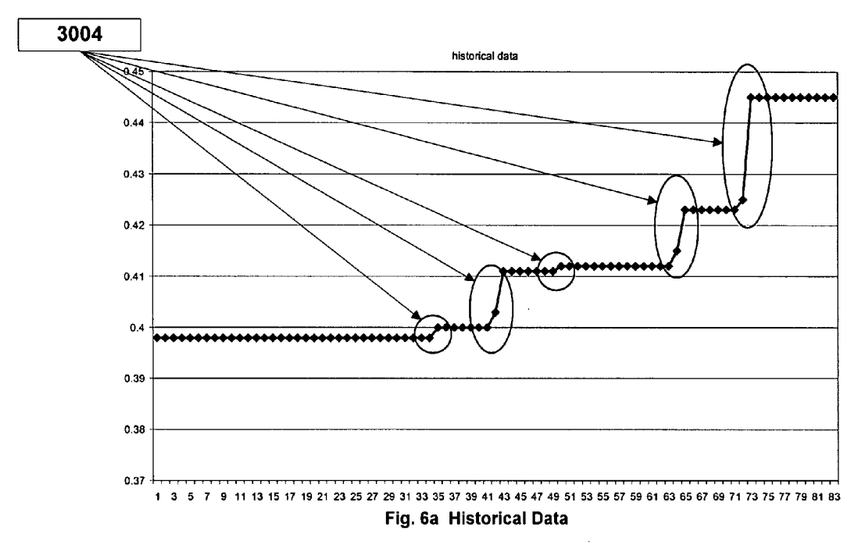

The CBSA method in one embodiment uses the clusters to detect seasonality in data. There are two types of events that can be found in time series data: outliers and level shifts. For level shifts, the same methodology as outlined above with respect to FIG. 3 and FIG. 4 is used in one embodiment. It is made possible by the mathematical principles summarized in FIG. 6: level shifts 3004 in actual data (FIG. 6*a*) correspond to outliers 3005 in rate-of-change data FIG. 6*b*. Thus, the problem of finding the points of transition from cluster to cluster are solved using the outlier-detection algorithm presented in FIG. 3 and FIG. 4.

Figure 7:
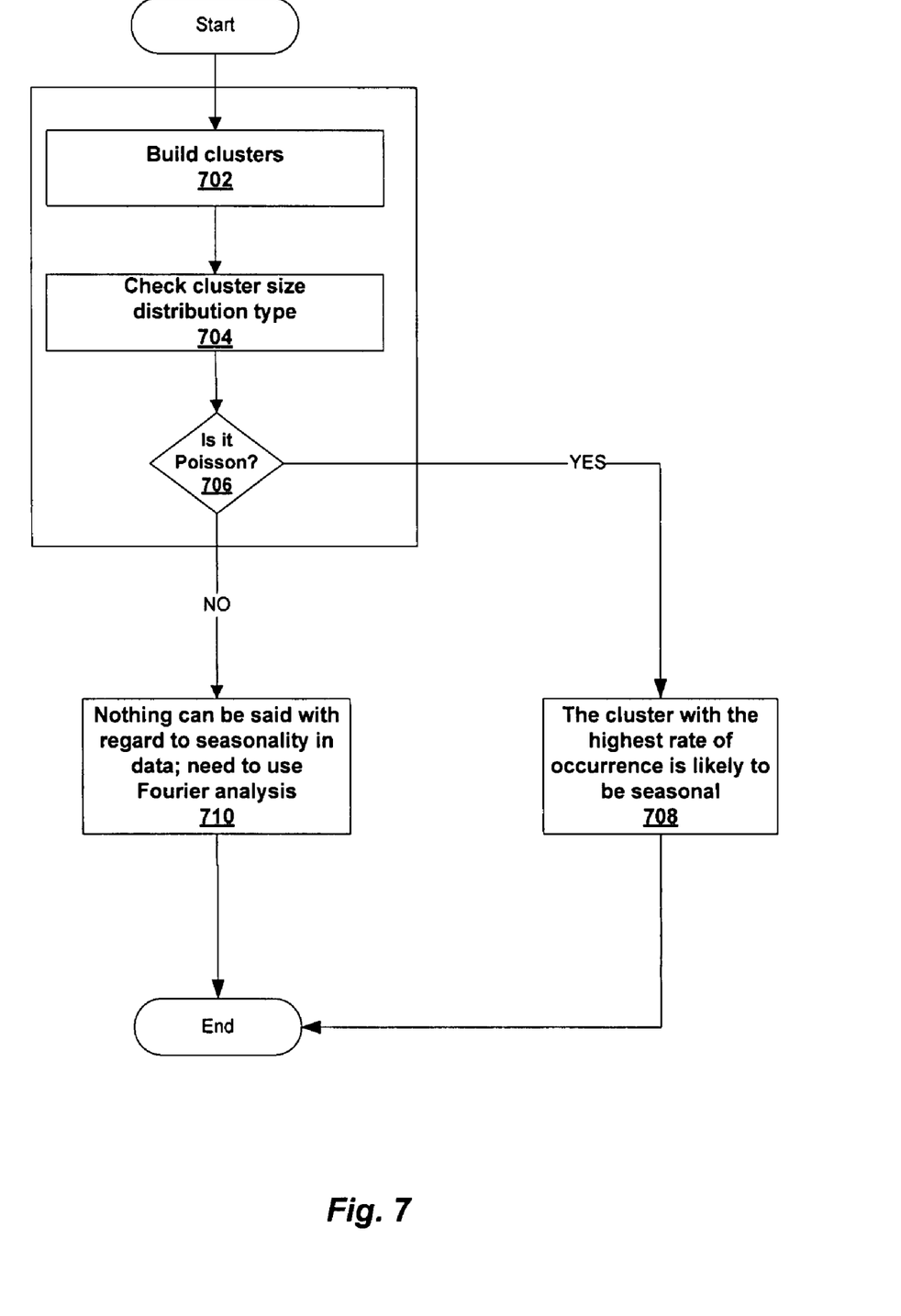
FIG. 7 illustrates a method for seasonality analysis based on cluster-size distribution in accordance with an embodiment of the present invention.
Figure 9:
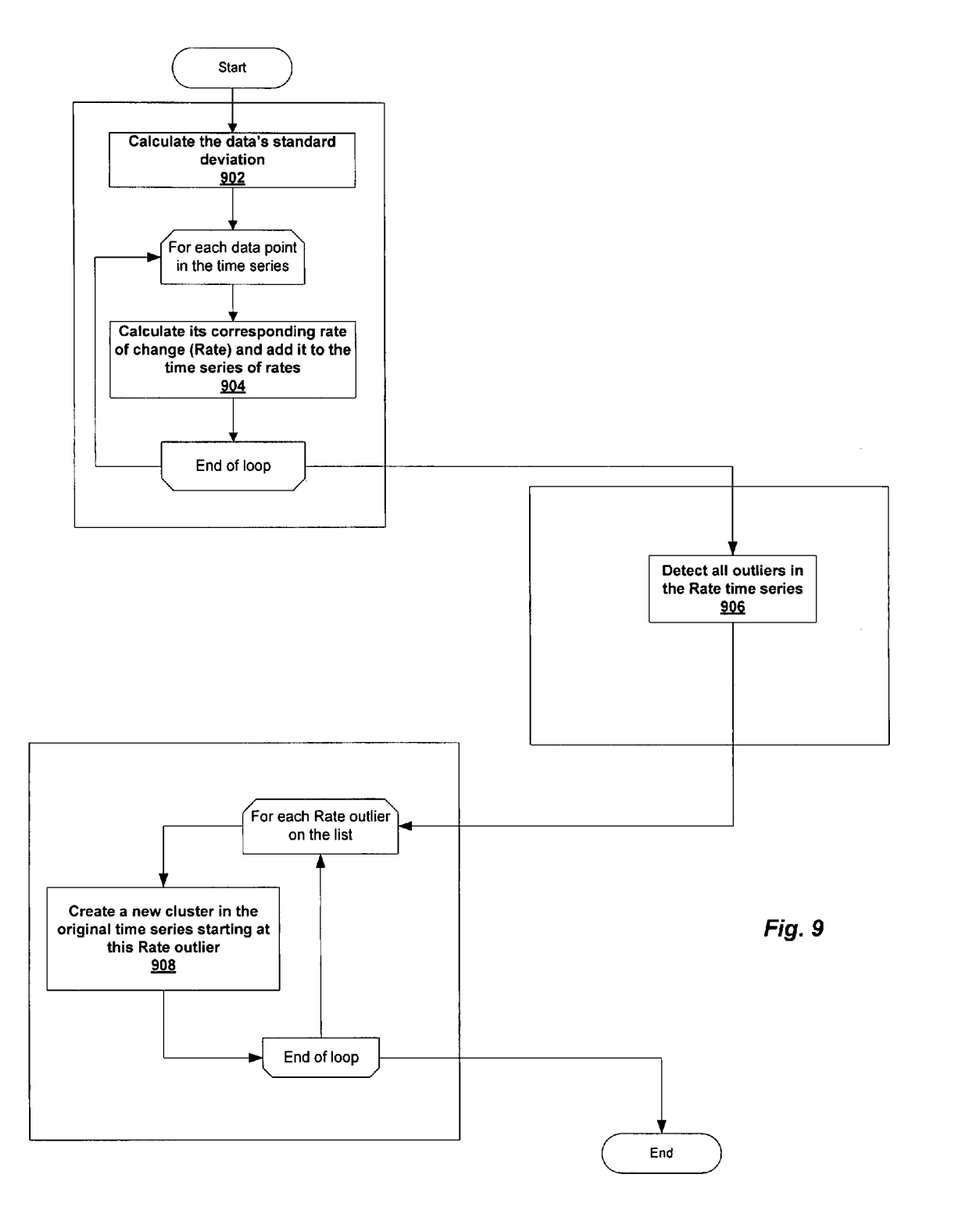
FIG. 9 illustrates a method for grouping data into clusters in accordance with an embodiment of the present invention.

This methodology in one embodiment uses the algorithm outlined in FIG. 7. Data are grouped 702 into clusters using the methods shown in FIG. 3 and FIG. 4 and FIG. 9. In FIG. 9, the data's standard deviation is calculated 902, and then for each data point in the series, its corresponding rate of change (Rate) is calculated 904 and added to the time series of rates. All outliers in the Rate time series are detected 906, and then for each Rate outlier on the list, a new cluster is created 908 in the original time series starting at that Rate outlier.

Continuing with FIG. 7, DPA engine 104 checks 704 whether the distribution of cluster sizes can be fitted reasonably well with a Poisson distribution, where "reasonably well" in one embodiment refers to the Chi-Square test used in statistics to analyze the distribution's "goodness of fit". If 706 it can—then 708 the number of points in the cluster (cluster size) that has been observed more frequently is likely to be the periodicity of the seasonal pattern. The likelihood of that is defined by the likelihood of it being a Poisson distribution. If, conversely, the distribution is not Poisson, then 710 nothing can be said with regard to seasonality in the data, so a Fourier analysis should be used.

In addition, in one embodiment, a flexible seasonality detection is used, wherein clusters whose sizes are similar, but not exactly the same, are still considered same size for the intents and purposes of the seasonality detection.

Other parameters related to the CBSA are related to the Chi-Square test, which in one embodiment is used to determine if the cluster sizes follow the Poisson distribution.

Fourier Analysis

Figure 10:
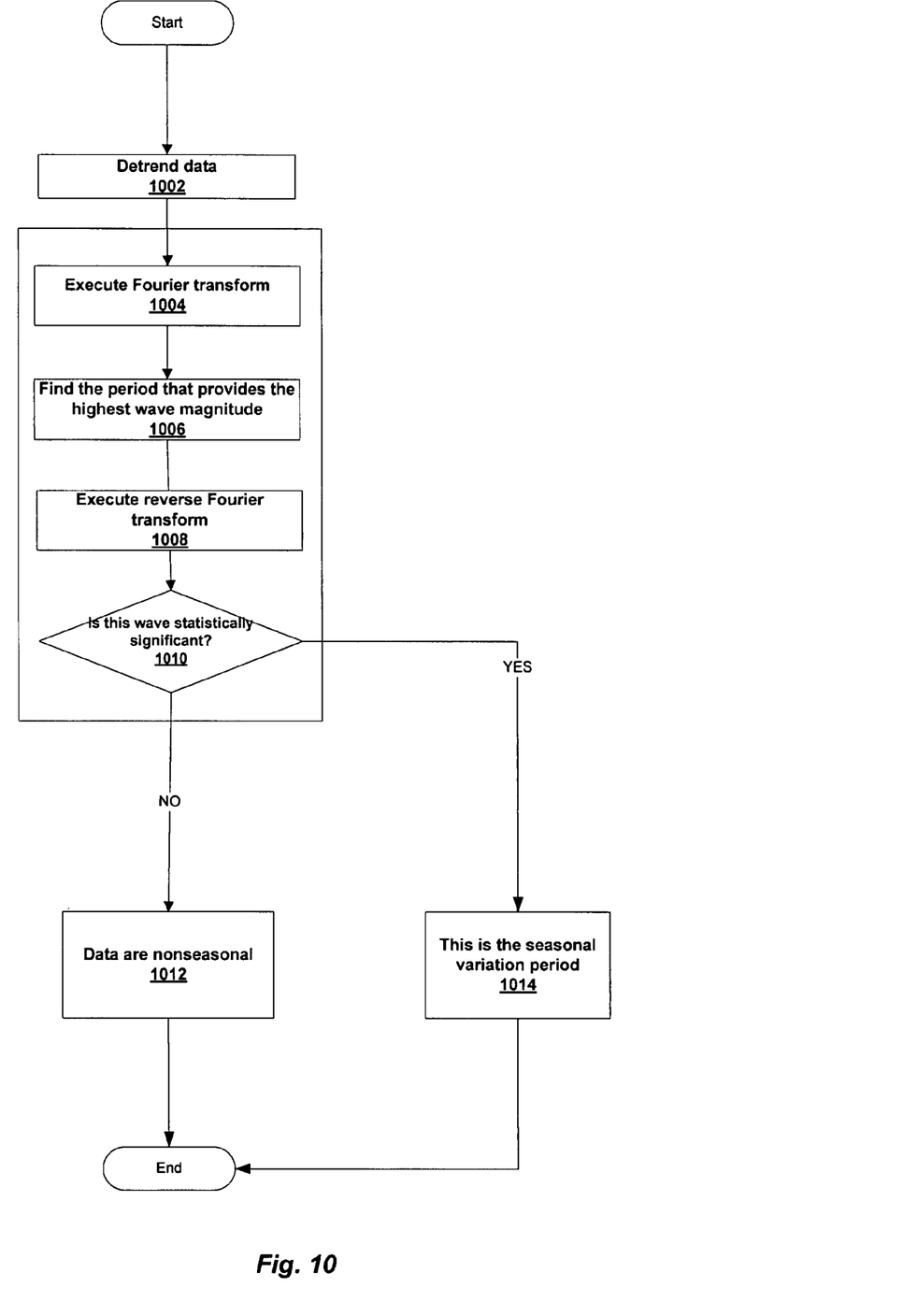
FIG. 10 illustrates a method for seasonality analysis based on a Fourier transform in accordance with an embodiment of the present invention.

In one embodiment, as illustrated in FIG. 10, a Fourier analysis is performed as described below to detect hidden seasonalities that may or may not be detectable by CBSA. The following steps illustrated in FIG. 10 are based on the assumption that the data have been de-trended 1002.

First, a Fourier transform is executed 1004 to shift data from the time domain into the frequency domain. Next, the frequencies are analyzed 1006 to find those that produce the largest magnitude. Then, a reverse Fourier transform is executed 1008 to obtain the seasonal component of the time-series data.

Next DPA 104 finds a correlation between the seasonal component and the de-trended data. In one embodiment, the $R^2$ scoring methodology is used as outlined above. A separate set of values for the same $R^2$-related parameters as were used for the trend analysis is used in one embodiment to analyze the seasonality for goodness of fit.

If 1010 the correlation is statistically significant, then 1014 the highest-magnitude period is the seasonal period in data; otherwise, the conclusion is 1012 that the data are non-seasonal.

Once the seasonality has been found 208, modeling engine 108 creates a model as described above. In one embodiment, the model can be evaluated to determine its strength. Techniques for obtaining a model quality index (MQI) are described further in U.S. patent application Ser. No. 11/823,111, titled "Evaluation of Data Models and Forecasts," filed on even date herewith and incorporated by reference herein in its entirety.

Embodiments in addition to those described above are also possible. For example:

- The Running-Mean (RM) may be calculated using a different methodology.
- The Fourier analysis may be expanded to return multiple seasonalities.
- The cluster-based seasonality analysis (CBSA) algorithm may be expanded to group two or more consecutive clusters into one if the cluster-size pattern is repeatable.
- For trend and seasonality, the $R^2$ scoring system may use different scales (non-proportional) for scoring the model's goodness-of-fit, which may or may not be beneficial, depending on the data behavior.

System 100 therefore provides an integrated, robust, and flexible combination of tools that can be used in data analysis as part of data preparation in forecasting models.

The algorithms described herein can be expanded as outlined above to further improve the models produced by using this methodology. The process flow shown in FIG. 2 may be altered to include only part of the data analysis, if the user of this algorithm is only interested in some aspects of the data set. That ensures the flexibility uniquely integrated into this approach. Furthermore, the scope of the invention can be expanded beyond being used as a tool for preliminary data analysis in forecasting models, and also as a standalone tool for any time-series data decomposition and cluster analysis.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the modeling engine 108 and forecasting engine 110, and so forth may be provided in many or one module.

Some portions of the above description present the feature of the present invention in terms of algorithms and symbolic representations of operations on information. These algorithmic descriptions and representations are the means used by those skilled in the art of data modeling and forecasting to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A system for generating a forecasting model for storage capacity planning, the system comprising:

a computer system comprising computer hardware, the computer system programmed to implement:
a data pattern analysis engine configured to:
receive time series data reflecting computer storage capacity;
identify a trend in the received time series data, using the received data, said identifying the trend comprising performing a transform of the time series data to derive a parameter, using the parameter to calculate a goodness-of-fit for a selected trend, and selecting the trend based at least partly on the calculated goodness-of-fit;
perform cluster-based seasonality analysis to identify seasonality in the received time series data, said performing comprising analyzing intervals between consecutive events to detect the seasonality; and
a forecast engine configured to select a forecast model adapted to predict an amount of additional computer storage capacity to obtain in the future and when to obtain the additional computer storage capacity, the forecast model operative to select the forecast model based at least partly on the identified trend and seasonality.

2. The system of claim 1, wherein the data pattern analysis engine is further configured to perform the cluster-based seasonality analysis by at least grouping data points in said intervals into clusters.

3. The system of claim 2, wherein the data pattern analysis engine is further configured to perform the cluster-based seasonality analysis by at least determining sizes of the clusters and determining whether a distribution of the cluster sizes approximately corresponds to a Poisson probability distribution.

4. The system of claim 3, wherein the data pattern analysis engine is further configured to, in response to determining that the distribution does not approximately correspond to the Poisson probability distribution, perform Fourier analysis to identify the seasonality in the time series data.

5. The system of claim 3, wherein the data pattern analysis engine is further configured to perform a Chi-square test to analyze the distribution's goodness of fit with the Poisson probability distribution.

6. The system of claim 1, wherein identifying the outlier points comprises calculating a standard deviation and running mean of the time series data, determining whether any data point is within a number of standard deviations from the running mean, and considering each data point that is greater than the number of standard deviations of the running mean to be an outlier point.

7. A method for detecting seasonality in time series data, the method comprising:
by a computer system comprising computer hardware:
receiving time series data reflecting computer storage capacity;
identifying a plurality of events in the time series data, the events comprising one or more of outlier points and level shifts;
performing an interpolation of the outlier points by at least substituting a value of each outlier point with a value calculated using linear interpolation;
identifying a trend in the received time series data;
performing cluster-based seasonality analysis to identify a first seasonality in the received time series data, said performing comprising analyzing intervals between consecutive events to detect clusters of data points and analyzing the clusters to identify the first seasonality; and
generating a forecast model based at least in part on the identified trend and first seasonality, the forecast model adapted to predict an amount of additional computer storage capacity to obtain in the future and when to obtain the additional computer storage capacity.

8. The method of claim 7, further comprising performing Fourier analysis to identify a second seasonality.

9. The method of claim 8, using one of the first and second seasonalities to select a forecast model.

10. The method of claim 8, using both the first and second seasonalities to select a forecast model.

11. The method of claim 7, wherein identifying the outlier points comprises:
calculating a standard deviation and running mean of the time series data,
performing a T-test to determine whether any data point is within a number of standard deviations from the running mean, and
considering each data point that is greater than the number of standard deviations of the running mean to be an outlier point.

12. The method of claim 7, wherein said identifying the trend comprises:
performing a Fisher transform of the time series data to derive a parameter,
using the parameter to calculate a goodness-of-fit for a selected trend, and
selecting the trend based at least partly on the calculated goodness-of-fit.

13. A method for data forecasting, the method comprising:
by a computer system comprising computer hardware:
receiving time series data reflecting computer storage capacity; and
generating a forecasting model from the time series data, the forecasting model adapted to predict an amount of additional computer storage capacity to obtain in the future and when to obtain the additional computer storage capacity, said generating the forecasting model comprising:
identifying a plurality of events in the time series data, the events comprising outlier points, wherein identifying the outlier points comprises calculating a standard deviation and running mean of the time series data, determining whether any data point is within a number of standard deviations from the running mean, and considering each data point that is greater than the number of standard deviations of the running mean to be an outlier point;
performing an interpolation of the set of outlier points by at least substituting a value of each outlier point with a value calculated using linear interpolation;
identifying a trend in the received time series data, using the received data and the interpolation, said identifying the trend comprising performing a transform of the time series data to derive a parameter, using the parameter to calculate a goodness-of-fit for a selected trend, and selecting the trend based at least partly on the calculated goodness-of-fit;
performing cluster-based seasonality analysis to identify seasonality in the received time series data, said performing comprising analyzing intervals between consecutive events to detect the seasonality; and creating the forecasting model based at least in part on the identified trend and seasonality.

14. The method of claim 13, wherein the events further comprise level shifts.

15. The method of claim 14, wherein said identifying the events further comprises detecting the level shifts from rate-of-change information derived from the time series data.

16. The method of claim 13, wherein said performing the cluster-based seasonality analysis further comprises grouping data points in said intervals into clusters.

17. The method of claim 16, wherein said performing the cluster-based seasonality analysis further comprises determining sizes of the clusters and determining whether a distribution of the cluster sizes approximately corresponds to a Poisson probability distribution.

18. The method of claim 16, further comprising, in response to determining that the distribution does not approximately correspond to the Poisson probability distribution, performing Fourier analysis to identify the seasonality in the time series data.

19. The method of claim 17, further comprising performing a Chi-square test to analyze the distribution's goodness of fit with the Poisson probability distribution.

20. The method of claim 18, further comprising de-trending the time series data prior to performing the Fourier analysis.

* * * * *